ANTENNA

Original Filed Dec. 30, 1933 2 Sheets-Sheet 1

INVENTOR
P. S. CARTER
BY H. S. Grover
ATTORNEY

INVENTOR
P. S. CARTER
BY H. E. Sweet
ATTORNEY

Reissued Oct. 29, 1940 Re. 21,609

UNITED STATES PATENT OFFICE 21,609

ANTENNA

Philip S. Carter, Port Jefferson, N. Y., assignor to Radio Corporation of America, a corporation of Delaware Original No. 2,058,412, dated October 27, 1936, Serial No. 704,706, December 30, 1933. Application for reissue August 30, 1939, Serial No. 292,657

11 Claims. (Cl. 250—33)

This invention relates to directive antenna systems, and particularly to a method of and apparatus for obtaining unidirectional radiation without the use of reflector arrangements.

In order to obtain directional radiation from an antenna, it has been the practice to utilize standing wave energy on the radiating elements and to provide a second antenna unit acting as a reflector where it has been desired to obtain a unidirectional system rather than a bidirectional one.

The present invention obviates the necessity for reflectors and provides an antenna which is nearly aperiodic over a wide range of frequencies. In carrying out the invention, use is made of the phenomena of attenuation along radiating wires in order to obtain unidirectionalism without the use of reflectors.

Generally speaking, the invention comprises a pair of approximately equal length antenna radiating sections which are relatively long with respect to the length of the communication wave and angularly disposed with respect to each other, each section, in turn, being composed of a plurality of radiating elements connected together by means of phasing members. In practicing the invention, it is essential that the radiating elements comprising each section be substantially coaxial with respect to one another so that they extend in the same direction and that the phasing elements connecting the radiating elements together shift the phase of the energy an amount just enough to make the ears of the radiation patterns of the different elements in each section add. It will thus be appreciated that the phasing elements which serve to provide maximum radiation from the system and thus maximum attenuation due to radiation should not reverse the phase of the currents between adjacent radiating elements.

Figure 4:
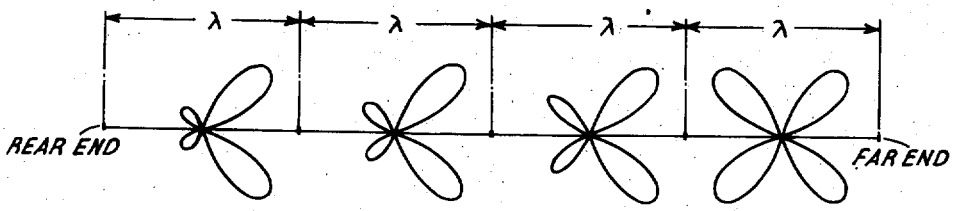
Figure 5:
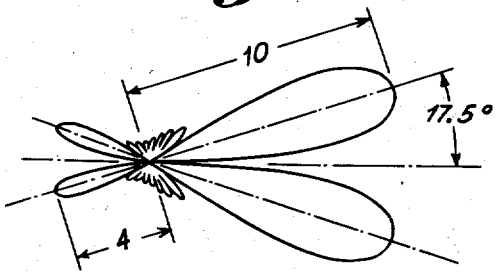
Figure 6:
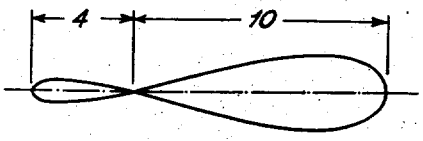
Figure 7:
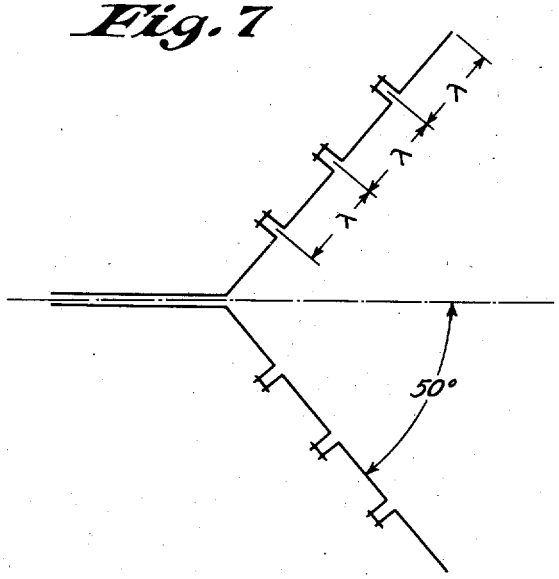
Figure 8:
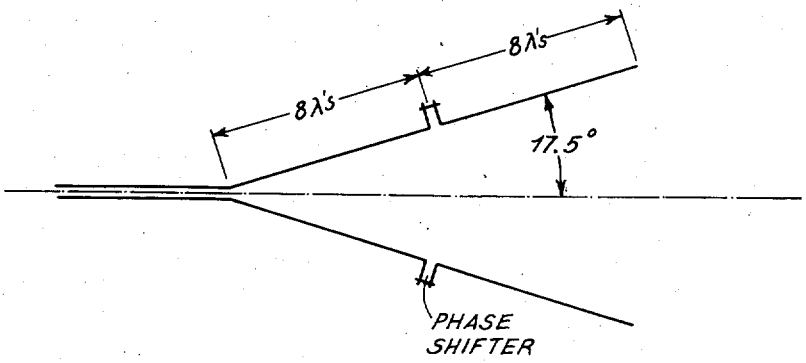

The invention is described in more detail in the following specification which is accompanied by drawings wherein Figures 1 to 5 illustrate curves given as explanatory of the theory underlying the invention, Figures 7 and 8 illustrate, by way of example only, two embodiments of the invention, and Figure 6 shows a typical radiation pattern for a system built in accordance with Figure 7.

Figure 1:
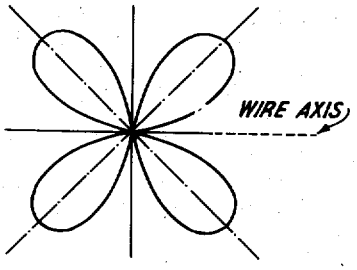
Figure 3:
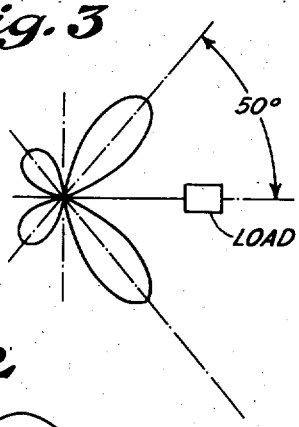
Figure 2:
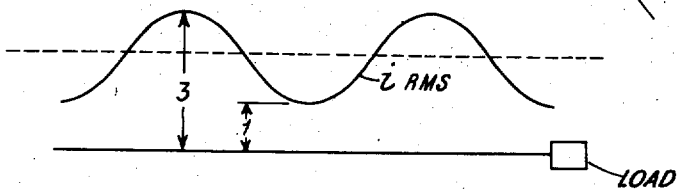

In Figure 1 there is shown the well known radiation pattern of a straight wire radiating element one wave length long which is energized with standing waves. This pattern has four main ears of directivity or two thick cones in space. If this wire were to terminate in an energy absorbing device of any form, for example a resistance, such that 50% reflection takes place and the current in the wires is of partial standing and partial traveling wave form, then the R. M. S. (root mean square) value of the current will be as illustrated in Figure 2, where "$i$" designates such current, and the "load" the energy absorbing device. Figure 3 illustrates the radiation pattern of such an arrangement from which it will be observed that there is much more radiation in the direction towards the load than in the opposite direction.

The present invention is based on an appreciation of the fact that a radiating wire is itself a load, and that if a number of similar radiating wires are placed in series there will be obtained a long linear radiator having unidirectional characteristics. Figure 4 shows the individual radiation patterns of four separate radiating wires when placed in series and energized from the near end. The resultant pattern of all four is appreciably unidirectional toward the far end, an effect which may be better observed from a study of Figure 5 which illustrates the resultant diagram of an antenna section eight wave lengths long. This figure shows a power ratio of front to back of ten to four and a maximum radiation at 17.5 degrees.

Due to the space phase relations of the current elements in an unbroken wire having a length equal to eight wave lengths whose pattern is that shown in Figure 5, maximum radiation takes place at an angle of 17.5 degrees to the wire, whereas, if considered in eight wire elements each of one wave length, the radiation from one wire element alone without the influence of the others is a maximum at an angle of approximately 50 degrees. The manner in which these angles are obtained is described more fully hereinafter. The energy radiated from each wire element of one wave length of such an arrangement of eight wave lengths is very much less than that radiated when the element exists alone in space; consequently its effective load on the preceding element is less than the load of an element existing alone in space. It will thus be evident that the attenuation per unit length of a long wire due to radiation is much less than that of a short wire. For instance, the power per ampere of loop current, or radiation resistance, for one wave length section alone is 94 watts, for a two wave length wire 57.5 watts per wave length, for a four wave length wire 33.75 watts per wave length, and for an eight wave wire 19.4 watts per wave length. The greater the attenuation, the more unidirectional will be the radiation. From a commercial standpoint it is not economical to dissipate power in a resistance in order to reduce reflection.

Reverting now to the consideration of two open-ended radiating sections which are angularly disposed with respect to each other so as to make a V and energized at their adjacent ends, the angle between the bisector and each wire, at which angle the radiation in the direction of the bisector is a maximum, is approximately $$\frac{50}{\sqrt{l/\lambda}} \text{ degrees}$$

or more accurately as described in my United States Patent No. 1,974,387, granted Sept, 18, 1934, approximately $$50.9\left(\frac{l}{\lambda}\right)^{-0.513} \text{ degrees}$$

where $l$ is the length of one wire and $\lambda$ the wave length. This angle is also the angle to an unbroken wire of length $1\lambda$ at which maximum radiation takes place. If the length $l$ of the section is broken up by phasing units into elements each having a length of one wave length, the maximum radiation from one unit by itself takes place at an angle of approximately 50 degrees to the wire, as given by $$\frac{50}{\sqrt{l/\lambda}}$$

By properly phasing the currents in succeeding elements, the radiation from each element may be made to add in perfect phase at an angle of 50 degrees to the wire. Under such conditions, maximum radiation will take place along the plane of the bisector of a V arrangement having an included angle of twice 50 degrees, or 100 degrees. Such an arrangement is shown in Figure 7. With this arrangement the radiation per ampere of current, or radiation resistance of each element is greatly increased over that for the same element of an unbroken wire of the length of the section. The attenuation is thus increased and, for the reasons previously given, the ratio of forward to backward radiation greatly increased. If the radiating elements are four wave lengths each, the included angle of the V is made twice 25 degrees. If eight wave lengths, the included angle is made twice 17.5 degrees.

According to the present invention, it is made possible to phase each wave length unit of the wire so that the components of radiation add along the 50 degree direction whereby the attenuation is greatly increased and an almost perfect unidirectional system obtained. One such arrangement for accomplishing this is illustrated in Figure 7 where there is provided an adjustable loop at each wave length for shifting the phase of the currents in adjacent sections so as to make the ears add up at the original angle of each ear. In practice, the phasing elements are adjusted until maximum radiation is obtained, as determined by a thermo-couple meter or by a calibrated receiving set. This manner of adjustment is well known to those skilled in the art. The law governing the phase adjustment is as follows: In considering the system shown in Fig. 7, for example, where the phasing elements are spaced one wave length apart and where the angle of each wire to the bisector (in the plane of which is the direction of maximum radiation) is 50°, the effective spacing in the direction of the bisector between the centers of any two adjacent one wave length radiating elements is evidently $$1\lambda \cos 50° = .643\lambda$$

which corresponds to a phase angle difference of $.643 \times 360°$ or 231.2°, since $1\lambda = 360°$ phase angle. Proceeding away from the apex, the current in one wave section lags that in the preceding section by 360° or 0°, according to our viewpoint. For best addition along the bisector it should lag by 231.2° or lead by 128.8°. When the phasing is accomplished by a U-shaped wire, the total wire length in the U should be $0.643\lambda$, except for certain corrections, depending upon spacing in the U, wire size, etc. Thus using the principles set forth in the foregoing specific cases, the general formula for the amount of phase lag $\phi$, to be given by the phase adjuster, may be written as follows:

$$\phi = \left(360° \times \frac{d}{\lambda}\right) \cos \alpha$$

in which $d$ is the distance between phasing units and $\alpha$ the half angle of the wire.

Figure 6 illustrates a typical radiation pattern for a system as illustrated in Figure 7. Instead of breaking up each radiating wire of the V into one wavelength long sections and separating the adjacent sections with a phasing unit as in Figure 7, the phasing elements may be provided at the end of each radiating element of eight wave lengths long, if desired, as shown in Figure 8. The latter arrangement has been found to be advantageous where it is desired to utilize an antenna sixteen wave lengths long. If the radiating section of each wire of the V is limited to eight wave lengths, it is feasible to break the section at the four wave length mark and to insert a phasing element, thus using the 25 degree angle which is correct for the unbroken length.

Turning now to the consideration of two open-ended radiating sections which are angularly disposed with respect to each other so as to make a V and energized at their adjacent ends, the formula which gives the angle of maximum radiation with respect to the radiating section is determined approximately by $$\frac{50}{\sqrt{l/\lambda}} \text{ degrees}$$

where $l/\lambda$ is greater than unity and $l$ is the length of the wire, $\lambda$ being the wave-length, both in the same units of measurements. If the sections are each one wave length long, the maximum radiation will be along the plane of the bisector of the angle between the diverging sections, so long as the angle between each radiating section and the bisector is made to be $$\frac{50}{\sqrt{1}}$$

or 50 degrees. Radiating sections of four wave lengths and eight wave lengths will thus give maximum radiation along the bisector at angles of 25 degrees and 17.5 degrees with the radiating sections, respectively.

It is to be understood that the invention is not limited solely to radiating elements in each section which are coaxially arranged, since the invention is equally applicable to arrangements where there are slight divergences from the coaxial position as long as the wires extend from the apex of the V.

I claim:

1. A unidirectional antenna comprising a pair of open-ended radiating sections which are long with respect to the working wavelength and disposed at an angle with respect to one another, each of said sections comprising a plurality of equal length substantially coaxial radiating elements connected together through phasing members, said phasing members being adjusted to enable maximum radiation in the direction of the plane of the bisector of the angle formed by the diverging sections, the angle between each radiating section and said bisector being substantially equal to $$\frac{50}{\sqrt{l/\lambda}} \text{ degrees}$$

where $l/\lambda$ is greater than unity, $l$ being the length of an unbroken radiating element in a section, and $\lambda$ the wave length.

2. A unidirectional antenna comprising two open-ended radiating sections, each of which is long with respect to the communication wave and disposed at an angle with respect to the other, each of said sections comprising a plurality of substantially coaxial radiating elements each eight wave lengths long connected together by phasing members, said phasing members being adjusted to enable maximum radiation at an angle to the radiating elements and along the plane of the bisector of the angle formed by the diverging sections, the angle between each radiating section and said bisector being 17.5 degrees and being substantially equal to $$\frac{50}{\sqrt{l/\lambda}} \text{ degrees}$$

wherein $l/\lambda$ is greater than unity, $l$ being the length of an unbroken radiating element in a section and $\lambda$ the wave length, whereby said two sections are separated by an angle equal to 35 degrees.

3. A unidirectional antenna comprising two open-ended radiating sections, each of which is long with respect to the communication wave and disposed at an angle with respect to the other, each of said sections comprising a plurality of substantially coaxial radiating elements each one wave length long connected together by phasing members, said phasing members being adjusted to enable maximum radiation at an angle to the radiating elements and along the plane of the bisector of the angle formed by the diverging sections, the angle between each radiating section and said bisector being substantially 50 degrees and being equal to $$\frac{50}{\sqrt{l/\lambda}} \text{ degrees}$$

where $l/\lambda$ is greater than unity, $l$ being the length of an unbroken radiating element in a section and $\lambda$ the wave length, whereby said two sections are separated by an angle equal to 100 degrees.

4. A unidirectional antenna comprising a pair of open-ended radiating sections which are long with respect to the working wavelength and disposed at an angle with respect to one another, each of said sections comprising two equal length, substantially coaxial, unbroken radiating elements connected together through a phasing member, said phasing member being adjusted to enable maximum radiation in the direction of the plane of the bisector of the angle formed by the diverging sections, the angle between each radiating section and said bisector being substantially equal to $$\frac{50}{\sqrt{l/\lambda}} \text{ degrees}$$

where $l/\lambda$ is greater than unity, $l$ being the length of an unbroken radiating element in a section, and $\lambda$ the wavelength.

5. An antenna system comprising a two-conductor transmission line, an antenna wire connected at one end to each conductor of said line and open at its other end, each of said antenna wires forming an acute angle with respect to a center line between them, both of said antenna wires diverging throughout their lengths from their points of connection to said transmission line, a phasing member dividing each of said antenna wires into two substantially equal sections, the sections of each antenna wire extending generally in the same straight line, said acute angle and said phasing members having such values as to cause the energy radiated by the sections of each antenna wire to add in phase along the plane of said center line.

6. An antenna system comprising a two-conductor transmission line, an antenna wire connected at one end to each conductor of said line and being insulated from ground at its other end, each of said antenna wires forming an acute angle with respect to a center line between them, both of said antenna wires diverging throughout their lengths from their points of connection to said transmission line, a plurality of phasing members in each antenna wire dividing the same into substantially equal sections, the sections of each antenna wire extending generally in the same straight line, said acute angle and said phasing members have such values as to cause the energy radiated by the sections of each antenna wire to add in phase along the plane of said center line.

7. A unidirectional antenna system comprising a two-conductor transmission line, an antenna comprising a pair of wires arranged in V formation, said wires being connected at one end to the conductors of said line and being insulated from ground at their other ends, a plurality of phasing members in each antenna wire dividing the same into sections extending generally in the same straight line, said phasing members and the angle of said V having such values as to cause the energy radiated by the sections of each antenna wire to add in phase along the plane of the bisector of said V.

8. An antenna system comprising a two-conductor transmission line, an antenna comprising a pair of wires arranged in V formation whose more closely adjacent ends are coupled to the conductors of said line, the other ends of said wires being open, each of said antenna wires comprising a plurality of sections extending generally in the same straight line and separated from one another by phasing elements, said phasing elements having such values as to cause the energy radiated by the sections of each antenna wire to add in phase in the direction of which each of said sections considered individually has substantially a maximum radiation, each section in each antenna wire being substantially equal to the length of the communication wave, the angle between each antenna wire and the plane of the bisector of said V being substantially 50°.

9. An antenna system comprising a two-conductor transmission line, an antenna comprising a pair of wires arranged in V formation whose more closely adjacent ends are coupled to the conductors of said line, the other ends of said wires being open, each of said antenna wires comprising a plurality of sections extending generally in the same straight line and separated from one another by phasing elements, said phasing elements having such values as to cause the energy radiated by the sections of each antenna wire to add in phase in the direction in which each of said sections considered individually has substantially a maximum radiation, each section in each antenna wire having a length substantially equal to four times the length of the communication wave, the angle between each antenna wire and the plane of the bisector of said V being substantially 25°.

10. An antenna system comprising a two-conductor transmission line, an antenna comprising a pair of wires arranged in V formation whose more closely adjacent ends are coupled to the conductors of said line, the other ends of said wires being insulated from ground, each of said antenna wires comprising a plurality of sections extending generally in the same straight line and separated from one another by phasing elements, said phasing elements having such values as to cause the energy radiated by the sections of each antenna wire to add in phase in the direction in which each of said sections considered individually has substantially a maximum radiation, each section in each antenna wire having a length substantially equal to eight times the length of the communication wave, the angle between each antenna wire and the plane of the bisector of said V being substantially 17.5°.

11. A unidirectional antenna system comprising a two-conductor transmission line, an antenna comprising a pair of wires arranged in V formation, said wires being connected at their ends near the apex of said V to said transmission line, phasing members dividing the wires of said V into substantially equal length sections, the sections of each wire of said V extending generally in the same straight line, said phasing members and the angle of said V having such values as to cause the energy radiated by the sections of each antenna wire to add in phase along the plane of the bisector of said V.

PHILIP S. CARTER.